(12) United States Patent
Nishida et al.

(10) Patent No.: US 8,766,615 B2
(45) Date of Patent: *Jul. 1, 2014

(54) DC-DC CONVERTER CONTROL CIRCUIT AND DC-DC CONVERTER INCLUDING SAME

(75) Inventors: Junji Nishida, Osaka (JP); Masaya Uchida, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 18 days.

This patent is subject to a terminal disclaimer.

(21) Appl. No.: 13/607,212

(22) Filed: Sep. 7, 2012

(65) Prior Publication Data

US 2013/0063108 A1    Mar. 14, 2013

(30) Foreign Application Priority Data

Sep. 13, 2011    (JP) .................................. 2011-199587

(51) Int. Cl.
G05F 1/00    (2006.01)

(52) U.S. Cl.
USPC ............ 323/283; 323/222; 323/282; 323/285

(58) Field of Classification Search
USPC .................. 323/222–225, 270–277, 282–285
See application file for complete search history.

(56) References Cited

U.S. PATENT DOCUMENTS

| | | | |
|---|---|---|---|
| 5,912,552 A * | 6/1999 | Tateishi | ........................ 323/285 |
| 7,319,311 B2 | 1/2008 | Nishida | |
| 7,482,796 B2 | 1/2009 | Nishida | |
| 7,504,805 B2 | 3/2009 | Nishida | |
| 7,560,911 B2 | 7/2009 | Nishida | |
| 7,936,160 B1 * | 5/2011 | Sheehan | ........................ 323/285 |
| 2006/0214648 A1 * | 9/2006 | Liu et al. | ........................ 323/222 |
| 2007/0176588 A1 | 8/2007 | Nishida | |
| 2007/0216389 A1 | 9/2007 | Nishida | |
| 2008/0061758 A1 | 3/2008 | Nishida | |
| 2008/0116869 A1 | 5/2008 | Nishida | |
| 2008/0174292 A1 | 7/2008 | Nishida | |
| 2008/0203990 A1 | 8/2008 | Nishida | |
| 2008/0315850 A1 | 12/2008 | Nishida | |
| 2009/0045791 A1 * | 2/2009 | Feng et al. | .................... 323/282 |
| 2009/0085540 A1 | 4/2009 | Nishida | |

(Continued)

FOREIGN PATENT DOCUMENTS

| | | |
|---|---|---|
| JP | 2006-517379 | 7/2006 |
| JP | 2007-004995 | 1/2007 |

(Continued)

*Primary Examiner* — Timothy J Dole
*Assistant Examiner* — Yusef Ahmed
(74) *Attorney, Agent, or Firm* — Cooper & Dunham LLP

(57) ABSTRACT

A DC-DC converter control circuit, to control a DC-DC converter having an inductor and two switching elements, including a first feedback circuit to generate a first feedback voltage indicating a DC component of an inductor current of the inductor based on an output current of the DC-DC converter; a second feedback circuit to generate a second feedback voltage indicating an AC component of the inductor current; a synthesis circuit to add the first and second feedback voltages to generate a third feedback voltage; a comparator to compare the third feedback voltage with a reference voltage to output a control signal; and a driving circuit to control the switching elements. The second feedback voltage is generated based on a difference between input and output voltages of the DC-DC converter when the control signal from the comparator is low and based on the output voltage when the control signal is high.

14 Claims, 14 Drawing Sheets

(56) References Cited

U.S. PATENT DOCUMENTS

| | | |
|---|---|---|
| 2009/0174384 A1 | 7/2009 | Michishita et al. |
| 2009/0273325 A1* | 11/2009 | Nakahashi et al. ............ 323/282 |
| 2010/0134085 A1 | 6/2010 | Nishida |
| 2011/0089918 A1* | 4/2011 | Chang ........................... 323/282 |
| 2011/0241641 A1* | 10/2011 | Chen et al. .................... 323/284 |
| 2012/0049829 A1* | 3/2012 | Murakami .................... 323/288 |
| 2012/0161728 A1* | 6/2012 | Chen et al. .................... 323/271 |
| 2013/0063105 A1* | 3/2013 | Nishida et al. ................ 323/271 |
| 2013/0063106 A1* | 3/2013 | Nishida et al. ................ 323/271 |
| 2013/0063107 A1* | 3/2013 | Nishida et al. ................ 323/271 |
| 2013/0063108 A1* | 3/2013 | Nishida et al. ................ 323/271 |

FOREIGN PATENT DOCUMENTS

| | | |
|---|---|---|
| JP | 2008-129481 | 6/2008 |
| JP | 2010-35316 | 2/2010 |
| WO | WO2004/070926 A2 | 8/2004 |

* cited by examiner

DC-DC CONVERTER CONTROL CIRCUIT AND DC-DC CONVERTER INCLUDING SAME

CROSS-REFERENCE TO RELATED APPLICATION

This patent application is based on and claims priority pursuant to 35 U.S.C. §119 to Japanese Patent Application No. 2011-199587, filed on Sep. 13, 2011 in the Japan Patent Office, the entire disclosure of which is hereby incorporated by reference herein.

BACKGROUND

1. Technical Field

The present disclosure relates to a DC-DC converter control circuit to control a DC-DC converter to moderate fluctuation in an output current of the DC-DC converter, and a DC-DC converter including the DC-DC converter control circuit.

2. Description of the Related Art

DC-DC converters that operate to generate a constant output current are known. FIG. 1 is a block diagram illustrating a configuration of a first conventional DC-DC converter. A DC-DC converter 100 shown in FIG. 1 includes transistors TR101 and TR102, diodes D101 through D104, an inductor L101, capacitors C101 and C102, resistors R101 through R107, operational amplifiers OP101 and OP102, a comparator CMP101, an oscillator OSC101, a reference voltage source E101. When an input voltage VIN is input to an input terminal 101, the DC-DC converter outputs an output voltage VOUT via an output terminal 102. The resistor R105 is used for detecting the output current of the DC-DC converter, the operational amplifier OP101 is used as an error comparator to control voltage, and the operational amplifier OP102 is used as an error comparator to control current. The DC-DC converter shown in FIG. 1 detects a voltage difference Vr105 across the resistor R105 generated by current flowing through the resistor R105 and controls the output current so that the output current at the output terminal 102 is kept constant based on the voltage difference Vr105.

In general, in DC-DC converters, an inductor current flowing through the inductor includes a ripple component. It is preferable that the ripple component be within a range of from 10% to 20% of the inductor current (e.g., 100 mA). However, in the DC-DC converter shown in FIG. 1, the strength of the ripple component of an inductor current I101 flowing through the inductor L101 fluctuates in accordance with the input voltage VIN and the output voltage VOUT. As a result, although an average value of the output current can be kept constant for a predetermined time period depending on the operating frequency, the output current itself cannot be kept constant.

FIG. 2 is a block diagram illustrating a configuration of a second conventional DC-DC converter. The DC-DC converter 110 shown in FIG. 2 includes transistors TR111 through TR113, a diode D111, a Zener diode D112, an inductor L111, capacitors C111 through C114, resistors R111 through R117, operational amplifiers OP111 through OP114, an inverter INV111, and a pulse-width modulator PWM111. During rectifying cycle, only during a period during which a voltage difference is present across the terminals of the inductor L111 does the operational amplifier OP111 (integrator) integrate a voltage at a positive terminal to detect the current, and keeps the output current constant based on the signal of the detection result.

However, in the DC-DC converter shown in FIG. 2, the current is detected using the integrator. Therefore, when the inductance of the inductor L111 or the frequency of the pulse-width modulator PWM111 is changed, it is necessary to change the integral constant. In addition, similarly to the DC-DC converter shown in FIG. 2, the strength of the ripple component of the inductor current flowing through the inductor L111 fluctuates, which may not keep the output current itself constant.

Thus, the output current of the DC-DC converter is affected by the fluctuation in the strength of the ripple component of the inductor current. Therefore, in the DC-DC converter, in order to reduce the fluctuation in the output current of the DC-DC converter, it is necessary to keep the strength of the ripple component of the inductor current constant.

In addition, the output current of the DC-DC converter is also affected by the fluctuation in the frequency of the ripple component of the inductor current. Therefore, in the DC-DC converter, in order to reduce the fluctuation in the output current of the DC-DC converter, it is necessary to keep the frequency of the ripple component of the inductor current constant as well.

BRIEF SUMMARY

In one aspect of this disclosure, there is a provided novel DC-DC convert control circuit to control a DC-DC converter including a power-supply terminal to which an input voltage is input, a ground terminal, an output terminal to output an output voltage, a first switching element and a second switching element connected in series between the power supply terminal and the ground terminal, an inductor connected between the output terminal and a junction node between the first switching element and the second switching element, and a first capacitor connected between the output terminal and the ground terminal. The DC-DC converter control circuit includes a first feedback circuit, a second feedback circuit, a synthesis circuit, a reference voltage generator circuit, a first comparator, and a driver circuit. The first feedback circuit detects an output current of the DC-DC converter and generates a first feedback voltage indicating a direct-current component of an inductor current flowing through the inductor based on the output current. The second feedback circuit generates a second feedback voltage indicating an alternating-current component of the inductor current flowing through the inductor of the DC-DC converter based on the input voltage and the output voltage of the DC-DC converter. The synthesis circuit adds the first feedback voltage and the second feedback voltage to generate a third feedback voltage. The reference voltage generator circuit generates a predetermined reference voltage corresponding to a desired output current of the DC-DC converter. The first comparator compares the third feedback voltage with the reference voltage and outputs a control signal in accordance with the comparison result to feed back to the second feedback circuit. The driver circuit controls the switching elements so that when the control signal is low, the first switching element is switched on and the second switching element is switched off, and when the control signal is high, the first switching element is switched off and the second switching element is switched on. The second feedback circuit operates in accordance with the control signal from the first comparator and generates the second feedback voltage based on a difference between the input voltage and the output voltage of the DC-DC converter when the control signal is low and generates the second feedback voltage based only on the output voltage of the DC-DC converter when the control signal is high.

In another aspect of this disclosure, there is a provided novel DC-DC converter including the power-supply terminal to which an input voltage is input, the ground terminal, the output terminal to output an output voltage, the first switching element and a second switching element connected in series between the power supply terminal and the ground terminal, the inductor connected between the output terminal and a junction node between the first switching element and the second switching element, the first capacitor connected between the output terminal and the ground terminal, and the above-described DC-DC converter control circuit.

BRIEF DESCRIPTION OF THE DRAWINGS

The aforementioned and other aspects, features, and advantages are better understood by reference to the following detailed description when considered in connection with the accompanying drawings, wherein.

DETAILED DESCRIPTION OF PREFERRED EMBODIMENTS

Figure 1:
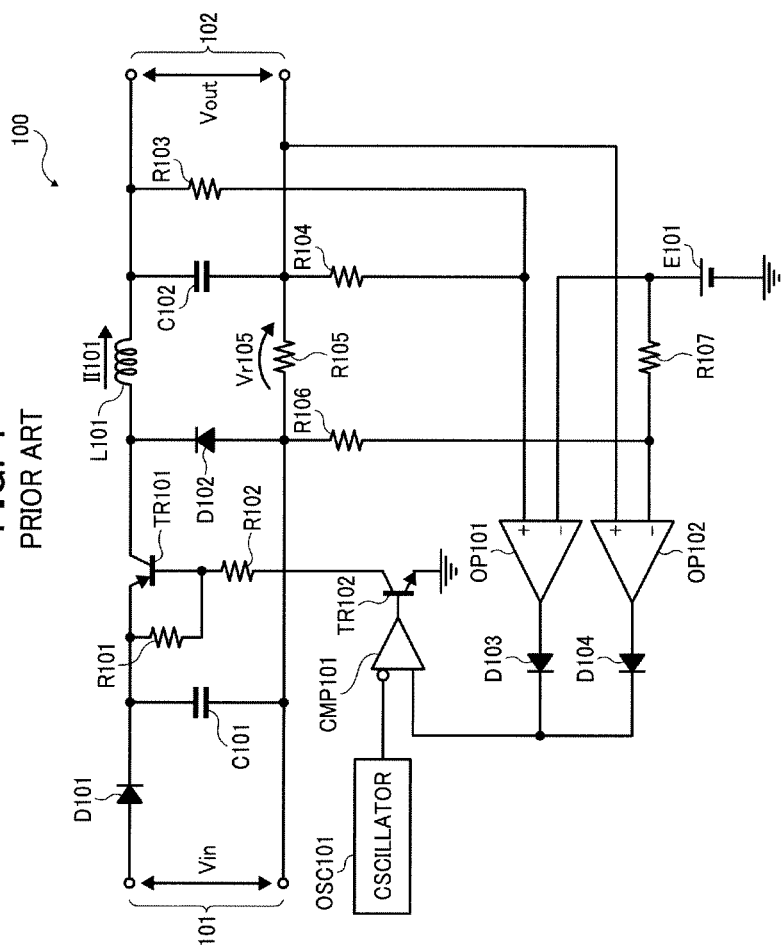
FIG. 1 is a block diagram illustrating a configuration of a first conventional DC-DC converter.
Figure 2:
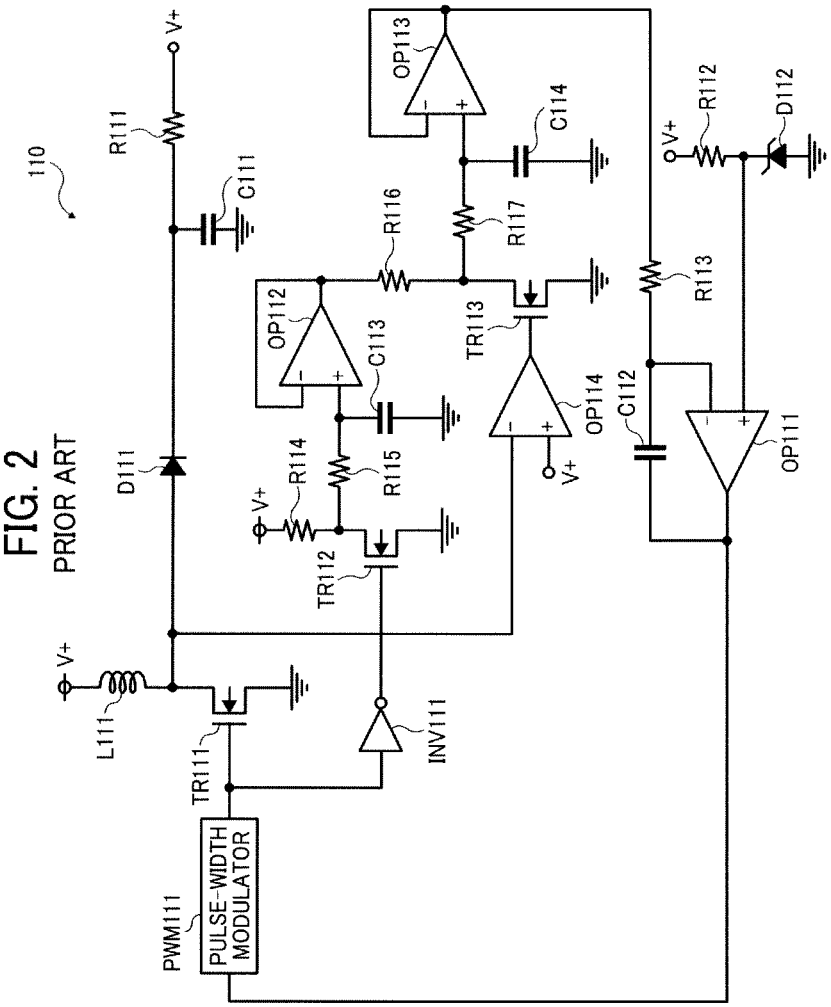
FIG. 2 is a block diagram illustrating a configuration of a second conventional DC-DC converter.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, particularly to FIGS. 3 through 19, DC-DC converters according to illustrative embodiments are described.

First Embodiment

Figure 3:
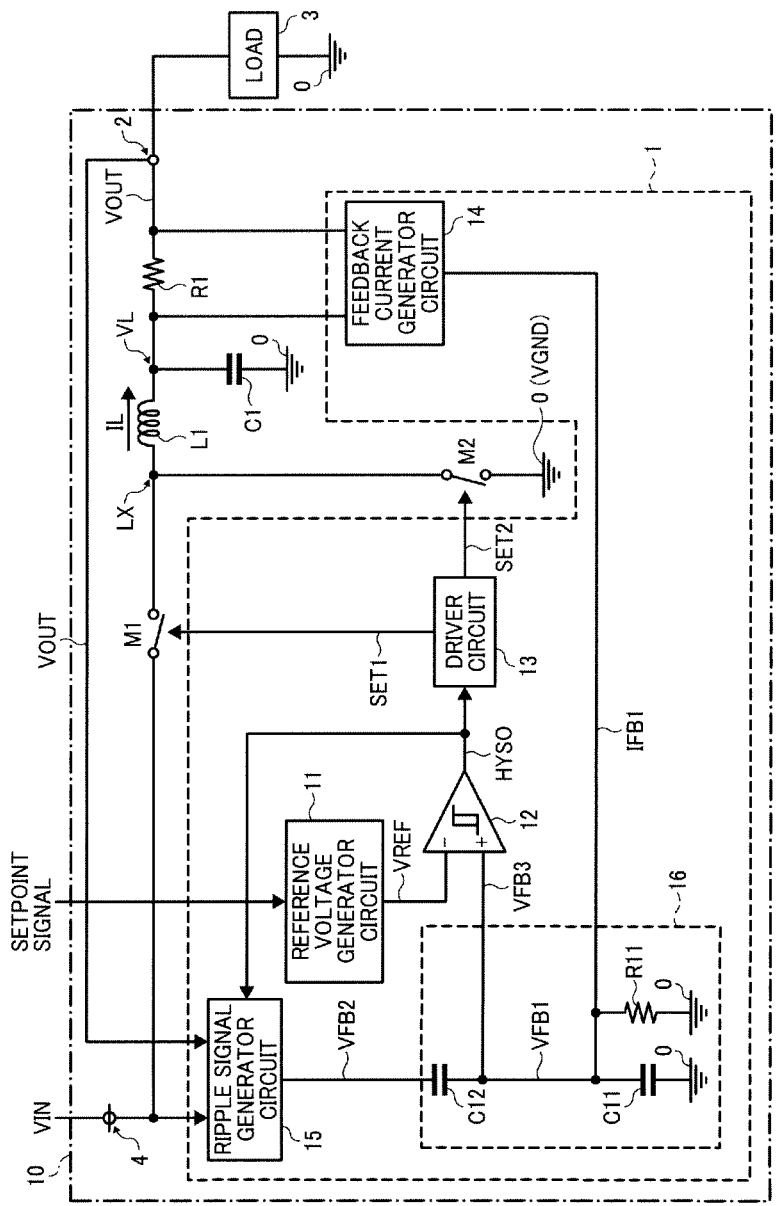
FIG. 3 is a block diagram illustrating a configuration of a DC-DC converter according to a first embodiment of this disclosure.

FIG. 3 is a block diagram illustrating a configuration of a DC-DC converter 10 according to the present embodiment of this disclosure.

The DC-DC converter 10 according to the first embodiment operates to reduce fluctuation in an output current; more particularly, it operates to keep the strength of a ripple component of an inductor current of an inductor connected to the output terminal constant.

In FIG. 3, the DC-DC converter 10 includes two switching elements M1 and M2 connected in series between a power-supply input terminal (power-supply terminal) 4 connected to a voltage source and a ground terminal 0, a converter control circuit 1 to control the switching elements M1 and M2, an output inductor L1 having one end connected to a junction node LX between the switching elements M1 and M2, an output capacitor C1 connected between a junction node VL of the other end of the inductor L1 and the ground terminal 0, and a resistor (output resistor) R1 for detecting the output current, connected between the junction node VL and an output terminal 2 of the DC-DC converter 10. The output terminal 2 of the DC-DC converter 10 is connected to a load 3.

Each of the switching elements M1 and M2 is constituted by, for example, power transistors. The switching element M1 functions as a power switch, and the switching element M2 functions as a rectification switch.

The converter control circuit 1 includes a reference voltage generator circuit 11, a comparator 12, a driver circuit 13, a feedback current generator circuit 14, a ripple signal generator circuit (second feedback circuit) 15, and a synthesis circuit 16.

The feedback current generator circuit 14 detects a voltage difference across the resistor R1 and outputs a current corresponding to the voltage difference to the synthesis circuit 16 as a feedback current IFB1. The synthesis circuit 16 includes a resistor R11 and capacitors C11 and C12. The resistor R11 and the capacitor C11 are electrically grounded, and the resistor R11 converts the feedback current IFB1 into a voltage. Then, the capacitor C11 removes the high-frequency component from the voltage to generate a first feedback voltage VFB1 (to be described later). The feedback current generator circuit 14, the resistor R11, and the capacitor C11 operate together as a first feedback circuit to generate the first feedback voltage VFB1. The first feedback voltage VFB1 corresponds to a direct-current (DC) component of an inductor current IL across the inductor L1.

An input voltage VIN, an output voltage VOUT from the output terminal 2, and a control signal HYSO output from the comparator 12 are input to the ripple signal generator circuit 15, and the ripple signal generator circuit 15 generates a voltage signal (ripple signal) having a waveform homothetic to a waveform of the ripple component of the inductor current IL, as a second feedback voltage VFB2. The second feedback voltage VFB2 corresponds to an alternating-current (AC) component of the inductor current IL.

In the synthesis circuit 16, by synthesizing the second feedback voltage VFB2 with the first feedback voltage VFB1 via the capacitor C12 of the synthesis circuit 16, a third feedback voltage VFB3 is generated. The third feedback voltage VFB3 is input to a non-inverting input terminal (+) of the comparator 12.

A reference voltage VREF generated in the reference voltage generator circuit 11 is input to an inverting input terminal (−) of the comparator 12. The comparator 12 is a hysteresis comparator whose threshold values vary within a predetermined voltage range VHYS around the reference voltage VREF.

In the converter control circuit 1, an output signal from the comparator 12 is used as a control signal HYSO to control overall operation of the converter control circuit 1. The control signal HYSO is input to the ripple signal generator circuit 15 and the driver circuit 13.

In accordance with the control signal HYSO, the driver circuit 13 generates a first driving signal SET1 to control the switching element M1 and a second driving signal SET2 to control the switching element M2. When the control signal HYSO is low, the switching element M1 is switched on and the switching element M2 is switched off. Conversely, when the control signal HYSO is high, the switching element M1 is switched off and the switching element M2 is switched on.

Figure 4:
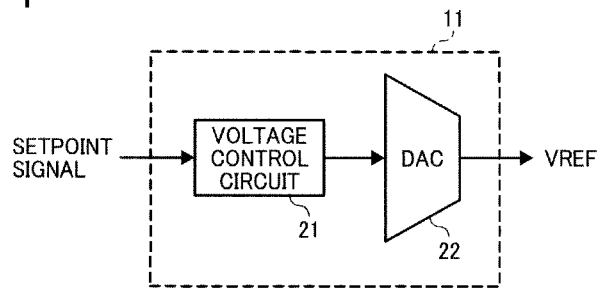
FIG. 4 is a block diagram illustrating a configuration of a reference voltage generator circuit shown in FIG. 3.

FIG. 4 is a block diagram illustrating a configuration of the reference voltage generator circuit 11 shown in FIG. 3. The reference voltage generator circuit 11 includes a voltage control circuit 21 and a digital-analog (D/A) converter (DAC) 22. The voltage control circuit 21 controls the D/A converter 22 in accordance with an external setpoint signal to generate a predetermined reference voltage VREF. The setpoint signal indicates a desired current of the inductor current IL corresponding to a desired output current of the DC-DC converter 10, and the reference voltage VREF is generated as a voltage corresponding to the desired current value.

In accordance with the setpoint signal, when the inductor current IL flowing through the inductor L1 is increased, the reference voltage generator circuit 11 increases the reference voltage VREF, and when the inductor current is decreased, the reference voltage generator circuit 11 decreases the reference voltage VREF. Accordingly, the inductor current IL is varied in accordance with the desired current value, and thus, the output current of the DC-DC converter 10 can be varied to obtain a desired value.

When the switching element M1 is switched on and the switching element M2 is switched off, the inductor current IL essentially varies in accordance with a voltage difference between the input voltage VIN and the output voltage VOUT according to the following formula:

$$dIL/dt=(VIN-VOUT)/L1 \tag{1}$$

On the other hand, when the switching element M1 is switched off and the switching element M2 is switched on, the inductor current IL essentially varies in accordance with the output voltage VOUT according to the following formula:

$$dIL/dt=(-VOUT)/L1 \tag{2}$$

Accordingly, the ripple component of the inductor current IL has wavelengths determined by formulas 1 and 2, in accordance with the states of the switching elements M1 and M2. Based on the input voltage VIN and the output voltage VOUT, the ripple signal generator circuit 15 generates a current having a waveform homothetic to a waveform of the ripple component of the inductor current IL and then generates the second feedback voltage VFB2 having a waveform homothetic to a waveform of the current.

Figure 5:
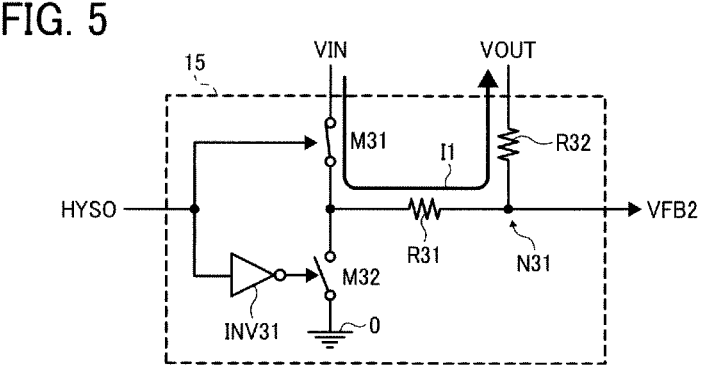
FIG. 5 illustrates operation of a ripple signal generator circuit when the control signal is high.
Figure 6:
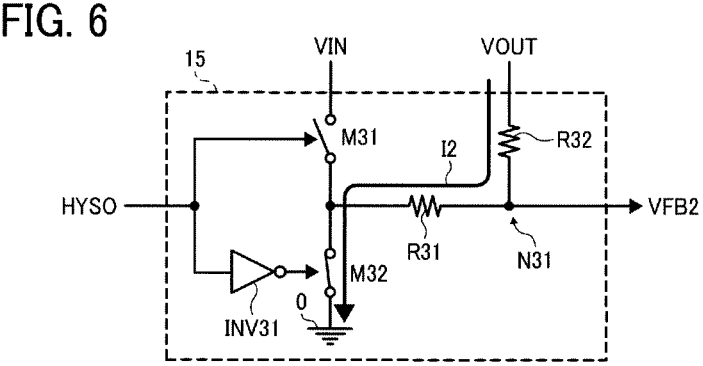
FIG. 6 illustrates the operation of the ripple signal generator circuit shown in FIG. 5 when the control signal is low.

FIGS. 5 and 6 are block diagrams illustrating the configuration of the ripple signal generator circuit 15. FIG. 5 illustrates operation of the ripple signal generator circuit 15 when the control signal HYSO is low, and FIG. 6 illustrates the operation when the control signal HYSO is high.

The ripple signal generator circuit 15 includes switching elements M31 and M32, resistors R31 and R32, and an inverter INV31. The switching element M31 and M32 are connected in series between the power-supply input terminal 4 (input voltage VIN) and the ground terminal 0 (ground voltage VGND). The first resistor R31 and the second resistor R32 are connected in series between a junction node between the switching elements M31 and M32 and a terminal through which the output voltage VOUT is input. The second feedback voltage VFB2 is generated at a junction node N31 between the first resistor R31 and the second resistor R32. The generated second feedback voltage VFB2 is sent to the synthesis circuit 16.

Switching of the switching element M31 is controlled by the control signal HYSO, and switching of the switching element M32 is controlled by the control signal HYSO inverted by the inverter INV31.

While the control signal HYSO is low (FIG. 5), the switching element M31 is on and the switching element M32 is off. By contrast, while the control signal HYSO is high (FIG. 6), the switching element M31 is off and the switching element M32 is on. Namely, the switching element M31 operates in conjunction with the switching element M1, and the switching element M32 operates in conjunction with the switching element M2.

In a state in which the switching element M31 is on and the switching element M32 is off (see FIG. 5), a current I1 proportional to a value [(VIN−VOUT)/(R31+R32)] flows inside the ripple signal generator circuit 15, and the second feedback voltage VFB2 proportional to the value of the current I1 is generated at the junction node N31. In a state in which the switching element M31 is off and the switching element M32 is on (see FIG. 6), a current I2 proportional to a value [(−VOUT)/(R31+R32)] flows inside the ripple signal generator circuit 15, and the second feedback voltage VFB2 proportional to the value of the current I2 is generated at the junction node N31.

Accordingly, the ripple signal generator circuit 15 generates a current having a waveform homothetic to the waveform of the ripple component of the inductor current IL and generates the second feedback voltage VFB2 having a waveform homothetic to the waveform of the current.

The third feedback voltage VFB3 made synthetically from the first feedback voltage VFB1 and the second feedback voltage VFB2 has a waveform homothetic to the waveform of the ripple component of the inductor current IL. The value of the third feedback voltage VFB3 is increased in proportional to the voltage difference [VIN−VOUT] when the control signal HYSO is low and is decreased in proportional to the output voltage VOUT when the control signal HYSO is high.

In addition, capacitances of the capacitors C11 and C12 are selected based on the following formulas, corresponding to an average frequency "f" of the second feedback voltage VFB2 and the third feedback voltage VFB3.

$$f=a/C11+b/C12 \tag{3}$$

Herein, "a" and "b" are certain coefficients assumed to be approximately constant. When the average frequency "f" is increased, the capacitances of the capacitors C11 and C12 are decreased so as to satisfy formula 3. When the average frequency "f" is decreased, the capacitances of the capacitors C11 and C12 are increased so as to satisfy formula 3.

(Variation of Ripple Signal Generator)

Figure 7:
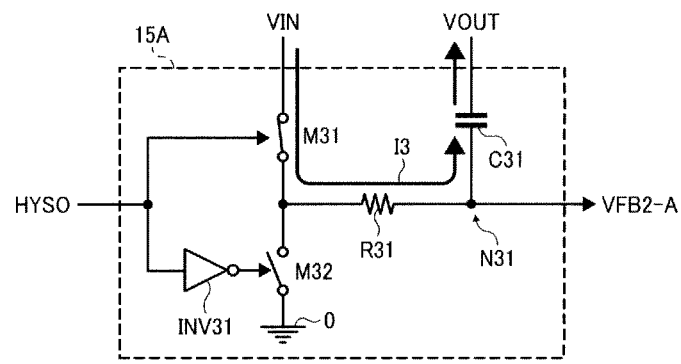
FIG. 7 illustrates the operation of a variation of a ripple signal generator circuit according to a variation shown in FIG. 5 when the control signal HYSO is low.
Figure 8:
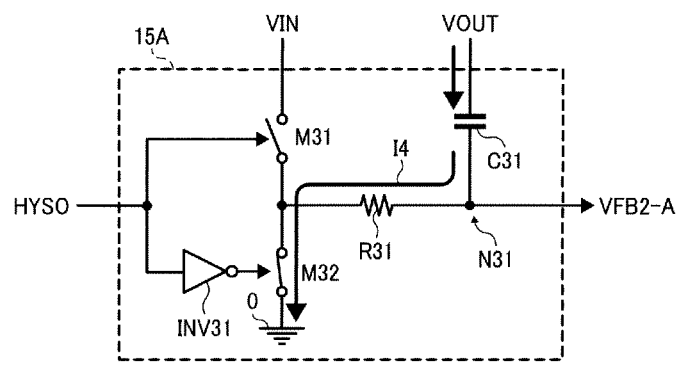
FIG. 8 illustrates the operation of the ripple signal generator circuit shown in FIG. 7 when the control signal HYSO is high.

FIGS. 7 and 8 are block diagrams illustrating a configuration of a ripple signal generator circuit 15-A according to a variation of the ripple signal generator circuit 15. FIG. 7 illustrates the operation of the ripple signal generator circuit 15A when the control signal HYSO is low, and FIG. 8 illustrates the operation when the control signal HYSO is high.

The ripple signal generator circuit 15A includes a capacitor (second capacitor) C31 instead of the resistor (second resistor) R32 in the ripple signal generator circuit 15 shown in FIGS. 5 and 6.

In a state in which the switching element M31 is on and the switching element M32 is off (see FIG. 7), a current I3 proportional to a value [(VIN−VOUT)/R31] flows inside the ripple signal generator circuit 15A, and a second feedback voltage VFB2-A proportional to the value of the current I3 is generated at a junction node N31 between the resistor R31 and the capacitor C31. In a state in which the switching element M31 is off and the switching element M32 is on (see FIG. 8), a current I4 proportional to a value [(−VOUT)/R31] flows inside the ripple signal generator circuit 14A, and the second feedback voltage VFB2-A proportional to the value of the current I4 is generated at the junction node N31.

Accordingly, the ripple signal generator circuit 15A generates a current having a waveform homothetic to the waveform of the ripple component of the inductor current IL and generates the second feedback voltage VFB2-A having a waveform homothetic to the waveform of the current.

Herein, to make synthetically with the second feedback voltage VFB2-A and the first feedback voltage VFB1, the capacitances of the capacitors C12 and C31 satisfies the relation "C31<<C12."

Figure 9:
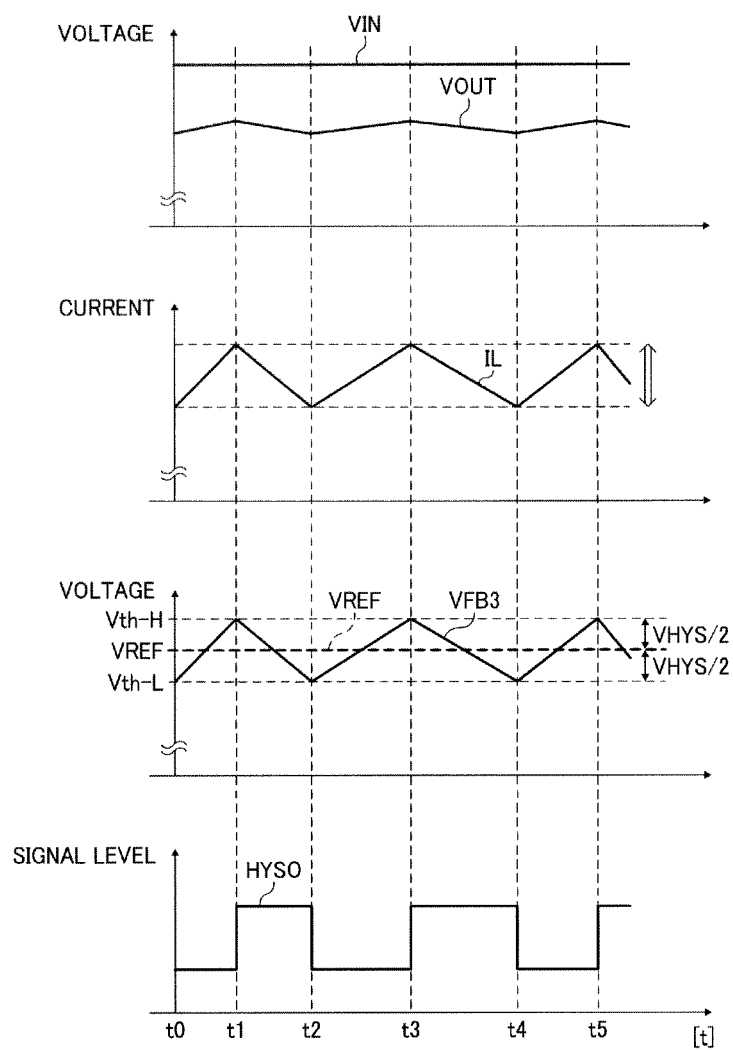
FIG. 9 is a timing chart illustrating waveforms of signals in the DC-DC converter shown in FIG. 3.

Next, operation of the DC-DC converter 10 is described with reference to FIG. 9. FIG. 9 is a timing chart illustrating waveforms of signals in the DC-DC converter 10. Herein, the reference voltage VREF is set at a predetermined constant value based on the setpoint signal, and FIG. 9 illustrates the operation of the current, signals, and voltages in the DC-DC converter 10 when the reference voltage VREF is set at the predetermined constant value.

The comparator 12 compares the third feedback voltage VFB3 with the reference voltage VREF and generates the control signal HYSO in accordance with the comparison result. The voltage range VHYS is set in the comparator 12 as a hysteresis voltage. That is, the comparator 12 stores a first threshold voltage Vth-H [Vth-H=VREF+VHS/2] that is greater than the reference voltage VREF and a second threshold voltage Vth-L [Vth-L=VREF−VHYS/2] that is smaller than the reference voltage VREF.

While the control signal HYSO is low, (for example, time period between t0 and t1 shown in FIG. 9), the third feedback voltage VFB3 is increased. Then, when the third feedback voltage VFB3 exceeds the first threshold voltage Vth-H [VFB3>VREF+VHYS/2], the comparator 12 switches the control signal HYSO from low to high. At this time, as described above, the switching element M1 is switched off and the switching element M2 is switched on, and accordingly, the inductor current IL flows from the ground terminal 0 to the inductor L1 via the switching element M2. As a time has elapsed, the inductor current IL is decreased, and the third feedback voltage VFB3 is also decreased.

Conversely, while the control signal HYSO is high, (for example, a time period between t1 and t2 shown in FIG. 9), the third feedback voltage VFB3 is decreased. Then, when the third feedback voltage VFB3 falls below the second threshold voltage Vth-L [VFB3<VREF−VHYS/2], the comparator 12 switches the control signal HYSO high to low. At this time, as described above, the switching element M1 is switched on and the switching element M2 is switched off, and accordingly, the input voltage VIN is applied to the inductor L1. As a time has elapsed, the inductor current IL is increased, and the third feedback voltage VFB3 is also increased.

Then, the above-described operation is repeated in accordance with increase and decrease in the third feedback voltage VFB3.

As the third feedback voltage VFB3 has a waveform homothetic to the waveform of the ripple component of the inductor current IL, the fluctuation range of the ripple component of the inductor current IL is in proportional to the voltage fluctuation range of the third feedback voltage VFB3. The fluctuation range of the third feedback voltage VFB3 is restricted within the voltage range VHYS by the comparator 12, and therefore, the fluctuation range of the ripple component of the inductor current IL can be restricted within a certain range (see FIG. 9).

As described above, the DC-DC converter 10 according to the present embodiment operates to keep the strength of the ripple component of the inductor current IL constant, which can reduce fluctuation in the output current. Accordingly, the DC-DC converter control circuit 10 can keep preferable load characteristics of the output current of the DC-DC converter 10.

Herein, the fluctuation range of the feedback current IFB1 obtained by the feedback current generator circuit 14 is smaller than the fluctuation range of the ripple component of the inductor current IL caused by the capacitor C1. However, in the present embodiment, the DC-DC converter 10 acquires the DC component and the AC component of the inductor current IL separately, and make synthetically the DC component and the AC component to generate the third feedback voltage VFB3. Thus, the third feedback voltage VFB3 can accurately follow the fluctuation in the ripple component of the original inductor current IL.

(Variation of Converter Control Circuit)

Figure 10:
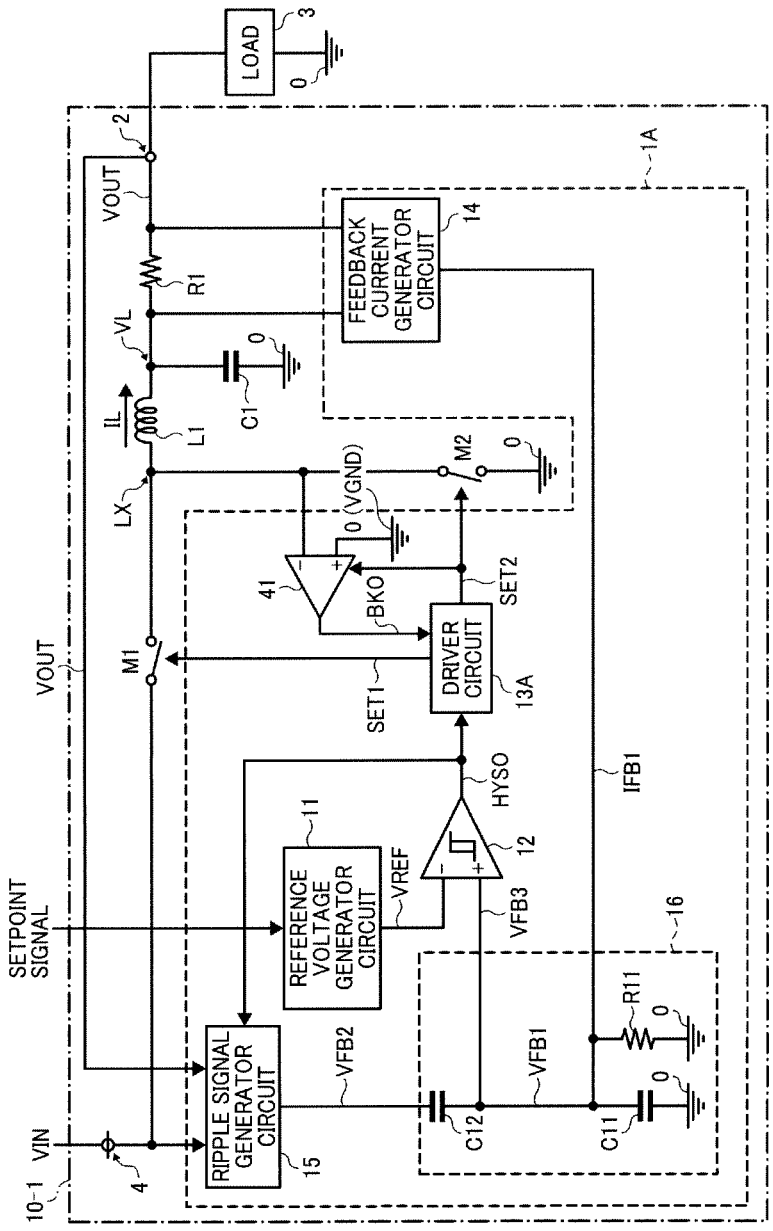
FIG. 10 is a block diagram illustrating a configuration of a DC-DC converter according to a variation of the first embodiment.

FIG. 10 is a block diagram illustrating a configuration of a DC-DC converter 10-1 according to a variation of the first embodiment.

In a converter control circuit 1A shown in FIG. 10, when the switching element M1 is on and the switching element M2 is off, the converter control circuit 1A detects an indication that a reverse current flows from the output terminal 2 to the ground terminal 0 via the inductor L1 and the switching element M2 and prevents the reverse current from flowing. More specifically, in addition to the components of the converter control circuit 1 shown in FIG. 3, the converter control circuit 1A further includes a comparator 41 to detect the reverse current. An inverting input terminal (−) of the comparator 41 is connected to the junction node LX, and a non-inverting input terminal (+) thereof is connected to the ground terminal 0.

When the switching element M2 is on, the comparator 41 compares a voltage at the junction node LX with the ground voltage VGND, and determines whether or not a voltage difference caused by a reverse current is generated. When a reverse current flows, the comparator 41 sends a reverse-current detection signal BKO to a driver circuit 13A.

In addition to the operation of the driver circuit 13 shown in FIG. 3, the driver circuit 13A shown in FIG. 10 switches both switching elements M1 and M2 off when the reverse-current detection signal BKO is input from the comparator 41 to the driver circuit 13A. Even when the comparator 41 detects the reverse current and the switching elements M1 and M2 are switched off, the ripple signal generator circuit 15 keeps generating the second feedback voltage VFB2 having a waveform homothetic to the waveform of the ripple component of the inductor current IL.

Accordingly, when the reverse current disappears, the driver circuit 13A can restart controlling the switching elements M1 and M2 in accordance with the control signal HYSO. In this variation, in addition to the effect of the DC-DC converter 10 shown in FIG. 3, the DC-DC converter 10-1 shown in FIG. 10 can prevent the adverse effects caused by reverse currents.

Second Embodiment

Figure 11:
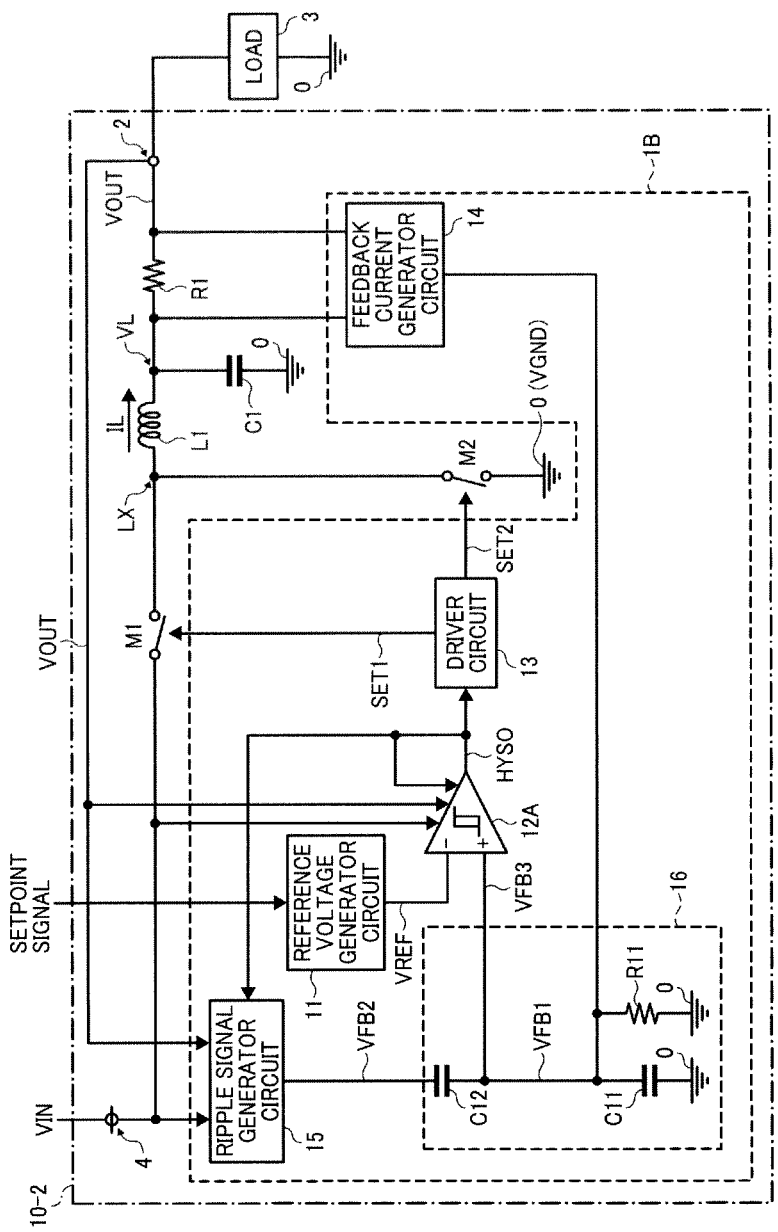
FIG. 11 is a block diagram illustrating a configuration of a DC-DC converter according to a second embodiment.

FIG. 11 is a block diagram illustrating a configuration of a DC-DC converter 10-2 according to a second embodiment. The DC-DC converter 10-2 according to the present embodiment operates to reduce fluctuation in the output current, more particularly, to keep the frequency of the ripple component of the inductor current of the inductor connected to the output terminal constant.

In FIG. 11, instead of the comparator 12 of the converter control circuit 1 shown in FIG. 3, the converter control circuit 1B includes a comparator 12A to which the input voltage VIN, the output voltage VOUT, and the control signal HYSO are input in addition to the reference voltage VREF and the third feedback voltage VFB3.

Figure 13:
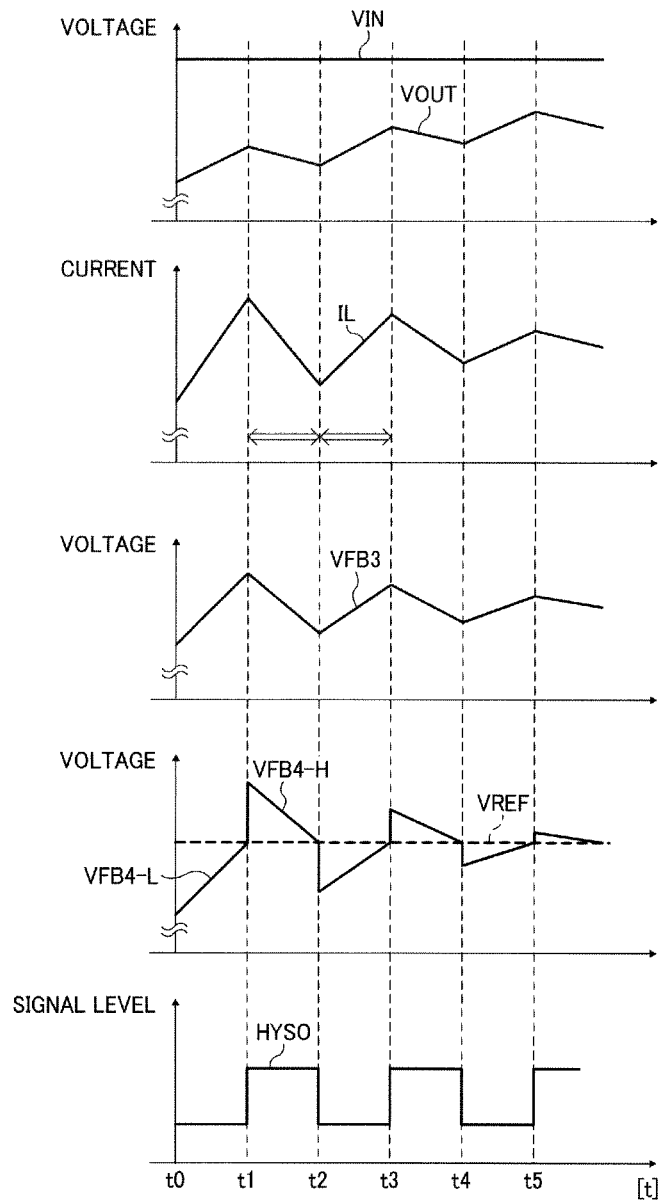
FIG. 13 is a timing chart illustrating waveforms in respective signal in the DC-DC converter.

The comparator 12A changes the strength (hysteresis) of a fourth feedback voltage VFB4 relative to the reference voltage VREF so that the fourth feedback voltage VFB4 periodically intersects with the reference voltage VREF, depending on the increase and the decrease in the fourth feedback voltage VFB4 (see FIG. 13).

Figure 12:
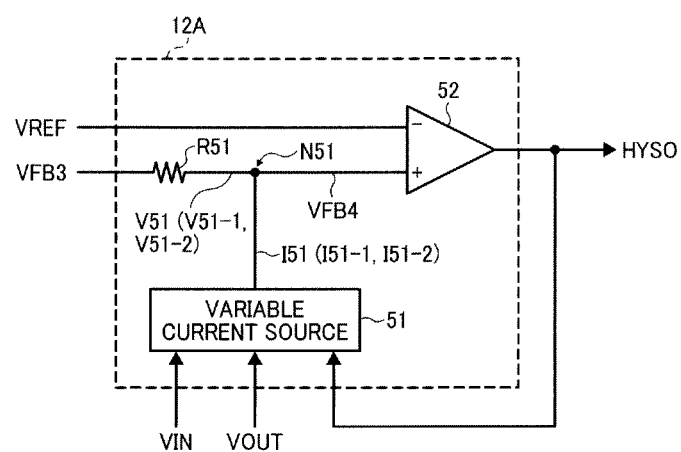
FIG. 12 is a block diagram illustrating a configuration of a comparator in the DC-DC converter shown in FIG. 11.

FIG. 12 is a block diagram illustrating a configuration of the comparator 12A. The comparator 12A includes a variable current source 51, a comparator 52, and a resistor R51. The comparator 52 is a normal comparator without hysteresis and the reference voltage VREF is input to an inverting input terminal (−) of the comparator 52.

The variable current source 51 generates a predetermined current I51, and the current flows through the resistor R51 to generate the predetermined voltage difference V51. The voltage difference V51 is superimposed on the third feedback voltage VFB3 at a junction node N51, which converts the third feedback voltage VFB3 into the fourth feedback voltage VFB4. The fourth feedback voltage VFB4 is input to a non-inverting input terminal (+) of the comparator 52. The comparator 52 compares the fourth feedback voltage VFB4 with the reference voltage VREF and generates the control signal HYSO in accordance with the comparison result.

Next, with reference to FIG. 13, the operation of the DC-DC converter 10-2 shown in FIG. 11 is described below. FIG. 13 is a timing chart illustrating waveforms in respective signal in the DC-DC converter 10-2. Herein, the reference voltage VREF is set at a predetermined constant value based on the setpoint signal shown in FIG. 4, and FIG. 11 illustrates the operation of the current, signals, and voltages in the DC-DC converter 10-2 when the reference voltage VREF is set at the predetermined constant value.

As illustrated in FIG. 13, when the control signal HYSO is low, the inductor current IL and the third feedback voltage VFB2 are gradually increased. When the control signal HYSO is high, the inductor current IL and the third feedback voltage VFB3 are gradually decreased.

While the third feedback voltage VFB3 is gradually increased (time period from t2 to t3 shown in FIG. 13), the comparator 12A subtracts a predetermined voltage V51-1 from the third feedback voltage VFB3 to generate the fourth feedback voltage (lower-level fourth feedback voltage) VFB4-L so that the fourth feedback voltage VFB4-L exceeds the reference voltage VREF at the end of a predetermined time period. More specifically, when the control signal HYSO falls (for example, at t2), the variable current source 51 obtains the voltage difference [VIN−VOUT] and generates a predetermined current I51-1 using the formula 1 based on the voltage difference [VIN−VOUT]. Then, the variable current source 51 keeps generating the current I51-1 in a time period (from t2 to t3) while the control signal HYSO is low. Subsequently, by subtracting the voltage V51-1 corresponding to the current I51-1 from the third feedback voltage VFB3, the fourth feedback voltage VFB4-L that is smaller than the reference voltage VREF and is gradually increased is generated.

At the end of time period during which the control signal HYSO is low (e.g., t3), when the fourth feedback voltage VFB4-L exceeds the reference voltage VREF, the comparator 52 switches the control signal HYSO from low to high.

While the third feedback voltage VFB3 is gradually decreased (time period from t1 to t2 shown in FIG. 13), the comparator 12A adds a predetermined voltage V51-2 to the third feedback voltage VFB3 to generate the fourth feedback voltage (higher-level fourth feedback voltage) VFB4-H so that the fourth feedback voltage VFB4-H is decreased and falls below the reference voltage VREF at the end of a corresponding time period. More specifically, when the control signal HYSO rises (for example, at t3), the variable current source 51 obtains the output voltage VOUT and generates a predetermined current I51-2 using the formula 2 based on the output voltage [VOUT]. The variable current source 51 keeps generating the current I51-2 during a time period (from t3 to t4) while the control signal HYSO is high. Subsequently, by adding the voltage V51-2 corresponding to the current I51-2 to the third feedback voltage VFB3, the fourth feedback voltage VFB4-H that is greater than the reference voltage VREF and is gradually decreased is generated.

At the end of time period during which the control signal HYSO is high (e.g., t4), when the fourth feedback voltage VFB4-H falls below the reference voltage VREF, the comparator 52 switches the control signal HYSO from high to low.

Then, above-described operation is repeated in accordance with the third feedback voltage VFB3.

In the second embodiment, similarly to the first embodiment, when the control signal HYSO is low, the inductor current IL is varied in accordance with the voltage difference [VIN−VOUT] (see formula 1), and when the control signal HYSO is high, the inductor current IL is varied in accordance with the value inverted output voltage [−VOUT] (see formula 2). In addition, when the control signal HYSO is low, the third feedback voltage VFB3 is varied in accordance with the voltage difference [VIN−VOUT], and when the control signal HYSO is high, the third feedback voltage VFB3 is varied in accordance with the inverted output voltage [−VOUT].

Accordingly, in the DC-DC converter 10-2 according to the second embodiment, the fourth feedback voltage VFB4 (VFB-L) is generated by subtracting the voltage value V51-1 corresponding to the voltage difference [VIN−VOUT] from the third feedback voltage VFB3 when the control signal HYSO is low, and the fourth feedback voltage VFB4 (VFB-H) is generated by adding the voltage value V51-2 corresponding to the inverted output voltage [−VOUT] to the third feedback voltage VFB3 when the control signal HYSO is high.

When the control signal HYSO is low, the subtrahend (V51-1) subtracted from the minuend fourth feedback voltage VFB4 relative to the third feedback voltage VFB3 is proportional to the voltage difference [VIN−VOUT]. When the control signal HYSO is high, the addend (V51-2) added to the fourth feedback voltage VFB4 relative to the third feedback voltage VFB3 is proportional to the inverted output voltage [−VOUT].

In addition, the third feedback voltage VFB3 is converted into the fourth feedback voltage VFB4 considering gradient of the third feedback voltage VFB3, and accordingly, the fourth feedback voltage VFB4 periodically intersects with the reference voltage VREF in accordance with the increase and the decrease in the third feedback voltage VFB3.

Thus, the time periods of the rising and the falling of the control signal HYSO are kept constant, and the frequency of the ripple component in the inductor current IL can be kept constant.

The capacitances of the capacitors C11 and C12 are selected to satisfy formula 3, assuming the frequency of the ripple component of the inductor current is "f".

As described above, the DC-DC converter 10-2 according to the second embodiment can operate to keep the frequency of the ripple component of the inductor IL constant, which can reduce the fluctuation in the output current.

Third Embodiment

Figure 14:
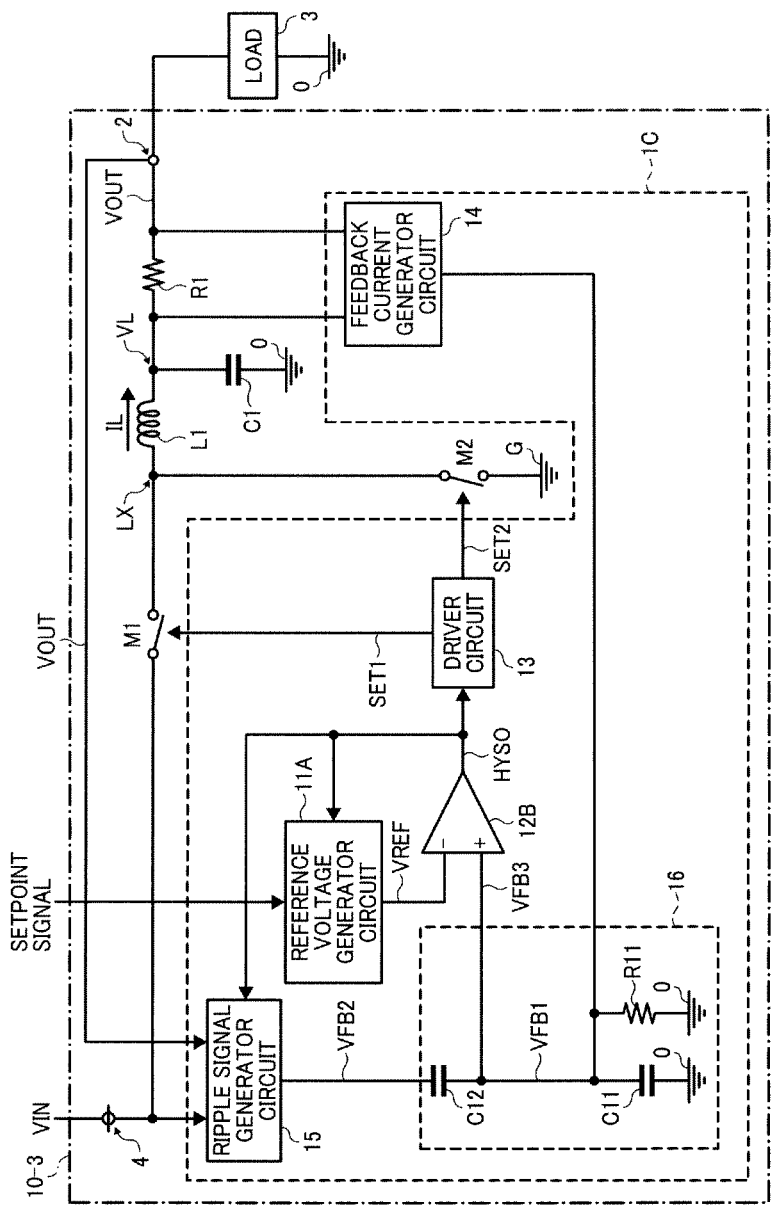
FIG. 14 is a block diagram illustrating a configuration of a DC-DC converter according to a third embodiment.

FIG. 14 is a block diagram illustrating a configuration of a DC-DC converter 10-3 according to a third embodiment. The DC-DC converter 10-3 according to the present embodiment operates to reduce the fluctuation in the output current; more particularly, to keep the strength of the ripple component of the inductor current of the inductor connected to the output terminal constant.

A converter control circuit 1C shown in FIG. 14 includes a normal comparator 12B without hysteresis, instead of the hysteresis comparator 12 of the converter control circuit 1 shown in FIG. 3, and a reference voltage generator circuit 11A that generates two reference voltages having high level and low level in accordance with the control signal HYSO in addition to the setpoint signal, instead of the reference voltage generator circuit 11. In the converter control circuit 1C, the reference voltage generator circuit 11A varies the strength (hysteresis) of the reference voltage VREF relative to the third feedback voltage VFB3, instead of varying the strength (hysteresis) of the third feedback voltage VFB3 relative to the reference voltage VREF as in the first and the second embodiments.

Figure 15:
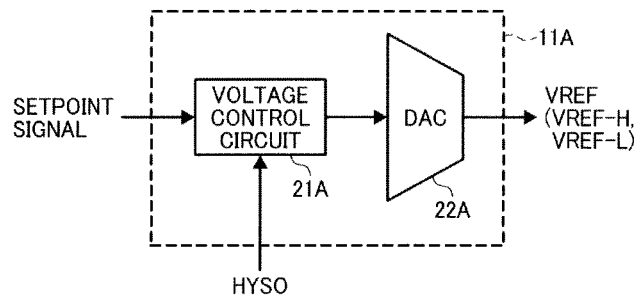
FIG. 15 is a block diagram illustrating a configuration of a reference voltage generator circuit in the DC-DC converter shown in FIG. 14.

FIG. 15 is a block diagram illustrating a configuration of the reference voltage generator circuit 11A shown in FIG. 14. The reference voltage generator circuit 11A includes a voltage control circuit 21A that operates depending on the control signal HYSO, instead of the voltage control circuit 21 shown in FIG. 4. The voltage control circuit 21A controls a D/A converter 22A in accordance with the setpoint signal, similarly to the voltage control circuit 21 shown in FIG. 4. When the control signal HYSO is low, the D/A converter 22A generates a high-level reference voltage VREF-H, while when the control signal HYSO is high, the D/A converter 22A generates a low-level reference voltage VREF-L.

The reference voltage generator circuit 11A selects the reference voltage VREF between the high-level reference voltage VREF-H and the low level reference voltage VREF-L within a predetermined voltage range VHYS, and accordingly, the strength of the reference voltage VREF relative to the third feedback voltage VFB3 is changed.

Figure 16:
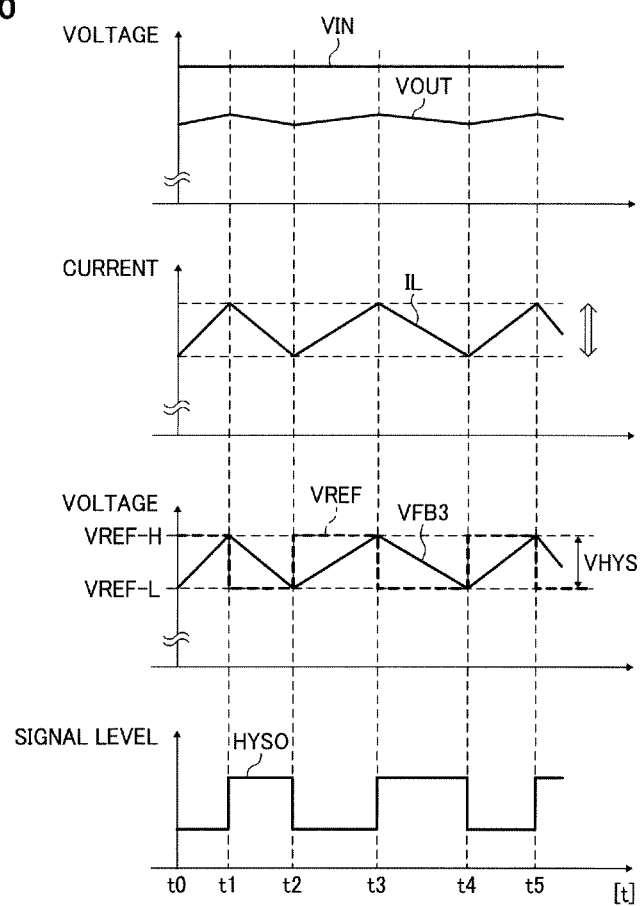
FIG. 16 is a timing chart illustrating waveforms of signals in the DC-DC converter shown in FIG. 14.

Next, the operation of the DC-DC converter 10-3 shown in FIG. 14 is described, with reference to FIG. 16. FIG. 16 is a timing chart illustrating waveforms of signals in the DC-DC converter 10-3.

The comparator 12B compares the third feedback voltage VFB3 with the reference voltages VREF-H and VREF-L to generate the control signal HYSO in accordance with the comparison result.

While the control signal HYSO is low, (e.g., time period from t0 to t1 shown in FIG. 16), the reference voltage generator circuit 11A selects the high-level reference voltage VREF-H, and the third feedback voltage VFB3 is increased. Then, when the third feedback voltage VFB3 exceeds the high-level reference voltage VREF-H, the comparator 12B switches the control signal HYSO from low to high.

While the control signal HYSO is high (e.g., time period t1 to t2 shown in FIG. 16), the reference voltage generator circuit 11A selects the low-level reference voltage VREF-L, and the third feedback voltage VFB3 is decreased. Then, when the third feedback voltage VFB3 falls below the low-level reference voltage VREF-L, the comparator 12B switches the control signal HYSO from high to low.

Then, the above-described operation is repeated in accordance with the increase and the decrease of the third feedback voltage VFB3.

As the fluctuation range of the third feedback voltage VFB3 is restricted within the voltage range VHYS, the fluctuation range of the strength of the ripple component of the inductor current IL can be restricted within a predetermined range (see FIG. 16). As described above, the DC-DC converter 10-3 according to the third embodiment can operate to keep the strength of the ripple component of the inductor IL constant, and thus, which can reduce the fluctuation in the output current.

Fourth Embodiment

Figure 17:
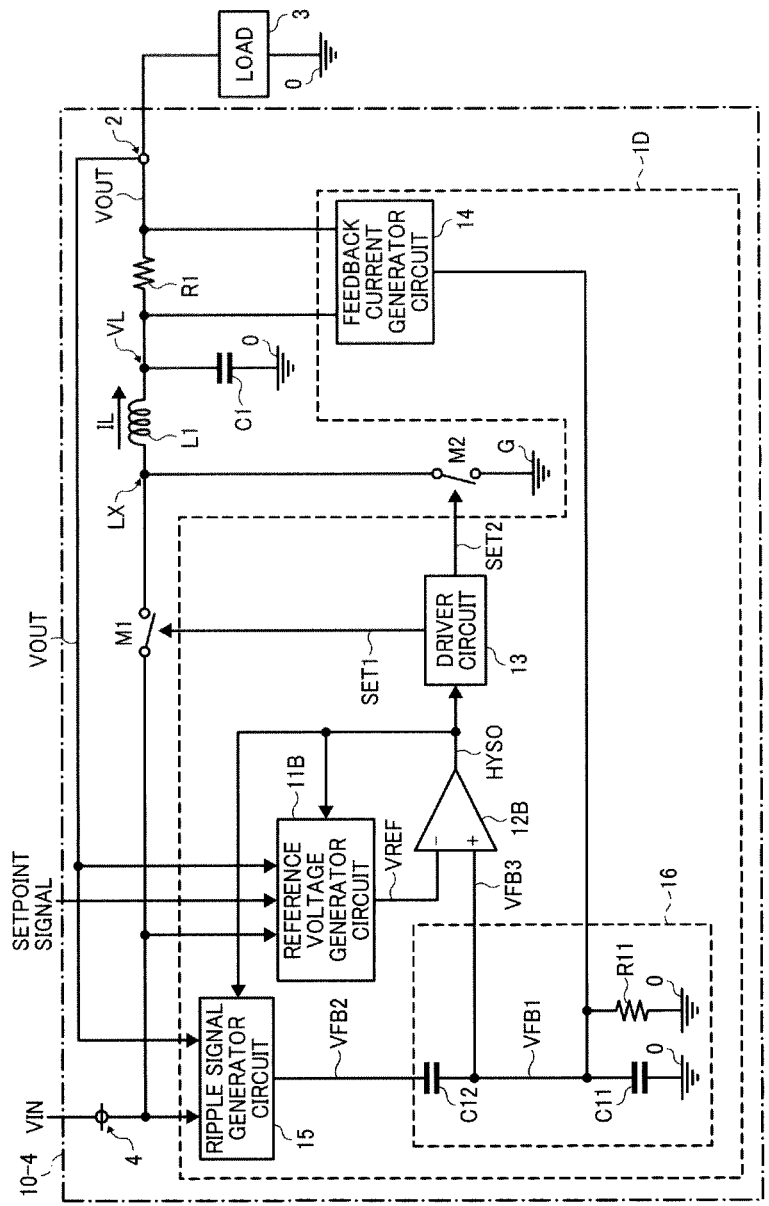
FIG. 17 is a block diagram illustrating a configuration of a DC-DC converter according to a fourth embodiment.

FIG. 17 is a block diagram illustrating a configuration of a DC-DC converter 10-4 according to a fourth embodiment. The DC-DC converter 10-4 operates to reduce the fluctuation in the output current; more particularly, to keep the frequency of the ripple component of the inductor current of the inductor connected to the output terminal constant.

In FIG. 17, a converter control circuit 1D includes a reference voltage generator circuit 11B to which the input voltage VIN and the output voltage VOUT are input in addition to the setpoint signal and the control signal HYSO, instead of the reference voltage generator circuit 11A of the converter control circuit 1C shown in FIG. 14. The reference voltage generator circuit 11B varies the strength (hysteresis) of the reference voltage VREF relative to the third feedback voltage VFB3 so that the third feedback voltage VFB3 periodically intersects with the reference voltage VREF following the increase and the decrease of the third feedback voltage VFB3.

Figure 18:
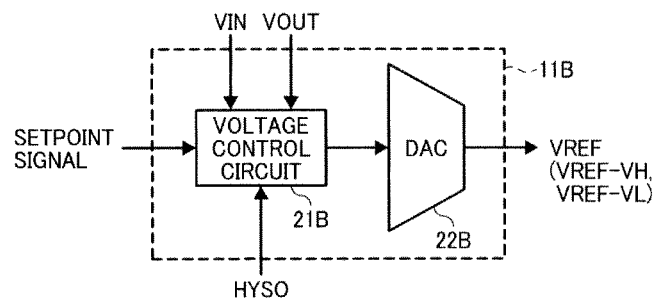
FIG. 18 is a block diagram illustrating a configuration of a reference voltage generator circuit in the DC-DC converter shown in FIG. 17.

FIG. 18 is a block diagram illustrating a configuration of the reference voltage generator circuit 11B. The reference voltage generator circuit 11B includes a voltage control circuit 21B that operates depending on the input voltage VIN, the output voltage VOUT, and the control signal HYSO, instead of the voltage control circuit 21A of the reference voltage generator circuit 11A shown in FIG. 15. The voltage control circuit 21B controls a DA converter 22B in accordance with the setpoint signal, similarly to the voltage control circuit 21 shown in FIG. 4. When the DA converter 22B generates a certain reference voltage VREF, the reference voltage VREF relative to the third feedback voltage VFB3 is changed.

Although the reference voltage generator circuit 11A of the third embodiment can generate two types of the reference voltages VREF-H and VREF-L, the reference voltage generator circuit 11B of the fourth embodiment can generate a variable reference voltage VREF (VREF-VL and VREF-VH) based on the input voltage VIN and the output voltage VOUT.

Figure 19:
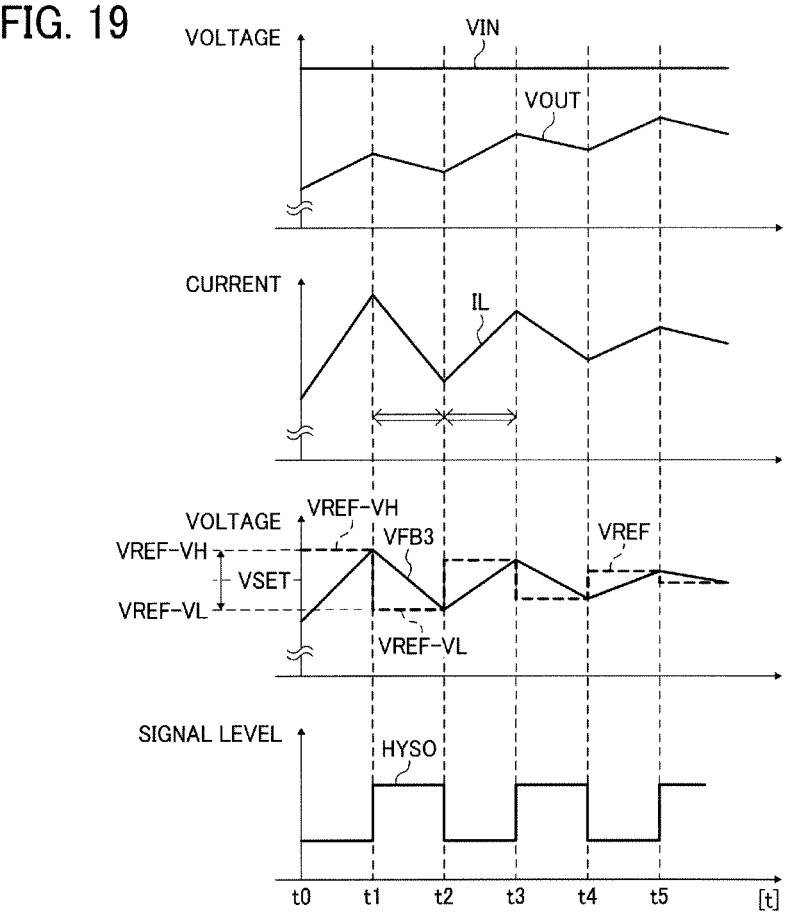
FIG. 19 is a timing chart illustrating the waveforms in the DC-DC converter shown in FIG. 17.

Next, with reference to FIG. 19, operation of the DC-DC converter 10-4 shown in FIG. 17 is described below. FIG. 19 is a timing chart illustrating the waveforms in the DC-DC converter 10-4.

As illustrated in FIG. 19, when the control signal HYSO is low, the inductor current IL and the third feedback voltage VFB3 are gradually increased. When the control signal HYSO is high, the inductor current IL and the third feedback voltage VFB3 are gradually decreased.

Herein, when the HYSO is switched low, the reference voltage generator circuit 11B increases a reference voltage VREF to a suitable high value VREF-VH in advance so that, while the third feedback voltage VFB3 is gradually increased (e.g., time period t0 to t1), the third feedback voltage VFB3 exceeds the increased reference voltage VREF-VH at the end (t1) of the predetermined time period (e.g., t0 to t1). In order to generate the suitable increased voltage VREF-VH, when the control signal HYSO is switched low (e.g., t0 or t2), the voltage control circuit 21B obtains the difference [VIN−VOUT] and adds a predetermined voltage Vdet-H based on the difference [VIN−VOUT] to a set value (setting reference voltage) Vset of the reference voltage VREF corresponding to the setpoint signal.

At the end of the time period during which the control signal HYSO is low (e.g., t1 or t3), when the third feedback voltage VFB3 exceeds the reference voltage VREF-VH, the comparator 12B switches the control signal HYSO from low to high.

Conversely, when the control signal HYSO is switched high, the reference voltage generator circuit 11B decreases the reference voltage VREF to a suitable low value VREF-VL in advance so that, while the third feedback voltage VFB3 is gradually decreased (e.g., time period t1 to t2), the third feedback voltage VFB3 falls below the decreased reference voltage VREF-VL at the end (t2) of the predetermined time period (t1 to t2). In order to generate the suitable decreased voltage VREF-VH, when the control signal HYSO rises (e.g., t1), the voltage control circuit 21B obtains the output voltage [VOUT], and subtracts a predetermined voltage Vdet-L based on the output voltage [VIN−VOUT] from the set value Vset of the reference voltage VREF corresponding to the setpoint signal.

At the end of the time period during which the control signal HYSO is high (e.g., t4), when the third feedback voltage VFB3 falls below the reference voltage VREF, the comparator 12B switches the control signal HYSO from high to low.

Then, the above-described operation is repeated in accordance with the increase and the decrease of the third feedback voltage VFB3.

Referring back to the second embodiment of the DC-DC converter 10-2 shown in FIGS. 11 through 13, the fourth feedback voltage VFB4 is generated by subtracting the voltage V51-1 corresponding to the voltage difference [VIN−VOUT] from the third feedback voltage VFB3 when the control signal HYSO is low, and is generated by adding the voltage V51-2 corresponding to the inverted output voltage (−VOUT) to the third feedback voltage VFB3 when the control signal HYSO is high.

By contrast, in the fourth embodiment of the DC-DC converter 10-4 shown in FIGS. 17 through 19, when the control signal HYSO is low, the increased reference voltage VREF-VH is set by adding the predetermined voltage Vdet-H based on the voltage difference [VIN−VOUT] to the set value Vset. When the control signal HYSO is high, the decreased reference voltage VREF-VL is set by subtracting the predetermined voltage Vdet-L based on the output voltage [VOUT] from the set value Vset.

That is, when the control signal HYSO is low, the addend Vdet-H of the reference voltage VREF(VREF-VH) is proportional to the voltage difference [VIN−VOUT], and when the control signal HYSO is high, the subtrahend Vdet-L of the reference voltage VREF(VREF-VH) is proportional to the output voltage [VOUT].

In addition, the increase and the decrease in the reference voltage VREF is determined considering the gradient of the third feedback voltage VFB3, and accordingly, the third feedback voltage VFB3 periodically intersects with the reference voltage VREF in accordance with the increase and decrease in the third feedback voltage VFB3.

Accordingly, the time period during which the rising and the falling of the control signal HYSO can be kept constant, and the frequency of the ripple component of the inductor current IL can be kept constant.

As described above, the DC-DC converter 10-4 according to the fourth embodiment can operate to keep the frequency of the ripple component of the inductor IL constant, which can reduce the fluctuation in the output current.

The respective converter control circuits 1, 1A through 1D can be integrated on a single integrated circuit (IC). Alternatively, the switching elements M1 and M2 can be formed as a part of the integrated circuit constituting the converter control circuits 1 and 1A through 1D. Yet alternatively, the variation of the first embodiment with reference to FIGS. 7, 8, and 10 can be combined with the configurations of the second through fourth embodiments.

In the DC-DC converter 10, and 10-1 through 10-4 according to the present disclosure, the ripple signal generator circuit 15 operates depending on the control signal HYSO. When the control signal HYSO is low, the second feedback voltage VFB2 is generated based on the voltage difference [VIN−VOUT], and when the control signal HYSO is high, the second feedback voltage VFB2 is generated based on the output voltage VOUT. Accordingly, whether the DC-DC converter 10 operates in discontinuous conduction mode (DCM) or continuous conduction mode (CCM), the second feedback voltage VFB2 having a waveform homothetic to the waveform of the ripple component (PWM signal) of the inductor current IL can be reliably generated.

That is, the third feedback voltage VFB3 is generated by obtaining the first feedback voltage VFB1 corresponding to the DC component of the inductor current IL and the second feedback voltage VFB2 corresponding to the AC component of the inductor current IL separately, and then synthesizing the first feedback voltage VFB1 and the feedback voltage VFB2, which allows the third feedback voltage VFB3 to accurately follow to the fluctuation in the ripple component of the original inductor current IL.

In above-described embodiments, the ripple signal generator circuit 15 (first, second, third, and fourth embodiments), the comparator 12A (second embodiment), and the reference voltage generator circuit 11B (fourth embodiment) operate depending on the voltage difference [VIN−VOUT]. Therefore, even when both input voltage VIN and the output voltage VOUT fluctuate, the strength of the ripple component of the inductor current (first and third embodiments) or the frequency of the ripple component of the inductor current (second and fourth embodiments) can be kept constant. Accordingly, in a case in which an inductor having a different inductance is used, the DC-DC converter of the present disclosure can stably operate.

As described above, the DC-DC converter control circuit causes the DC-DC converter to operate so that the strength or the frequency of the ripple component of the inductor current can kept constant, which can reduce fluctuation in the output current of the DC-DC converter. In the present disclosure, the DC-DC converter can include one of the above-described DC-DC converter control circuits.

Numerous additional modifications and variations are possible in light of the above teachings. It is therefore to be understood that, within the scope of the appended claims, the disclosure of this patent specification may be practiced otherwise than as specifically described herein.

What is claimed is:

1. A DC-DC converter control circuit to control a DC-DC converter including a power-supply terminal to which an input voltage is input, a ground terminal, an output terminal to output an output voltage, a first switching element and a second switching element connected in series between the power supply terminal and the ground terminal, an inductor connected between the output terminal and a junction node between the first switching element and the second switching element, and a first capacitor connected between the output terminal and the ground terminal, the DC-DC converter control circuit comprising:
a first feedback circuit to detect an output current of the DC-DC converter and generate a first feedback voltage indicating a direct-current component of an inductor current flowing through the inductor based on the output current;
a second feedback circuit to generate a second feedback voltage indicating an alternating-current component of the inductor current flowing through the inductor of the DC-DC converter based on the input voltage and the output voltage of the DC-DC converter;
a synthesis circuit to add the first feedback voltage and the second feedback voltage to generate a third feedback voltage;
a reference voltage generator circuit to generate a predetermined reference voltage corresponding to a desired output current of the DC-DC converter;
a first comparator to compare the third feedback voltage with the reference voltage and output a control signal in accordance with the comparison result to feed back to the second feedback circuit; and
a driver circuit to control the switching elements so that when the control signal is low, the first switching element is switched on and the second switching element is switched off, and when the control signal is high, the first switching element is switched off and the second switching element is switched on,
wherein the second feedback circuit operates in accordance with the control signal from the first comparator and generates the second feedback voltage based on a difference between the input voltage and the output voltage of the DC-DC converter when the control signal is low and generates the second feedback voltage based only on the output voltage of the DC-DC converter when the control signal is high.

2. The DC-DC converter control circuit according to claim 1, wherein the first comparator comprises a hysteresis comparator having a first threshold voltage that is greater than the reference voltage and a second threshold voltage that is smaller than the reference voltage,
wherein the hysteresis comparator switches the control signal from low to high when the third feedback voltage exceeds the first threshold voltage and switches the control signal from high to low when the third feedback voltage falls below the second threshold voltage.

3. The DC-DC converter control circuit according to claim 1, wherein the first comparator converts the third feedback voltage to generate a fourth feedback voltage in accordance with the input voltage, the output voltage of the DC-DC converter, and the control signal from the first comparator,
when the control signal is low, the first comparator generates the fourth feedback voltage obtained by subtracting a predetermined voltage generated based on the difference between the input voltage and the output voltage from the third feedback voltage so that the fourth feedback voltage exceeds the reference voltage at the end of a predetermined time period,
when the control signal is high, the first comparator generates the fourth feedback voltage obtained by adding a predetermined voltage generated based on the output voltage to the third feedback voltage so that the fourth feedback voltage falls below the reference voltage at the end of the predetermined time period, and
the first comparator controls the control signal so that the control signal switches from low to high when the fourth feedback voltage exceeds the reference voltage and the control signal switches from high to low when the fourth feedback voltage falls below the reference voltage.

4. The DC-DC converter control circuit according to claim 1, wherein the reference voltage generator circuit operates to generate a high-level reference voltage when the control signal is low and a low-level reference voltage when the control signal is high,
wherein the first comparator controls switches the control signal from low to high when the third feedback voltage exceeds the high-level reference voltage and switches the control signal from high to low when the third feedback voltage falls below the low-level reference voltage.

5. The DC-DC converter control circuit according to claim 1, wherein the reference voltage generator circuit generates a variable reference voltage in accordance with the input voltage, the output voltage of the DC-DC converter, and the control signal from the first comparator,
when the control signal is low, the reference voltage generator circuit generates the reference voltage obtained by adding a predetermined voltage generated based on the difference between the input voltage and the output voltage to a setting reference voltage so that the third feedback voltage exceeds the reference voltage at the end of the predetermined time period,
when the control signal is high, the reference voltage generator circuit generates the reference voltage obtained by subtracting a predetermined voltage generated based on the output voltage from the setting reference voltage so that the third feedback voltage falls below the reference voltage at the end of the predetermined time period, and
the first comparator switches the control signal from low to high when the third feedback voltage exceeds the reference voltage and switches the control signal from high to low when the third feedback voltage falls below the reference voltage.

6. The DC-DC converter control circuit according to claim 1, wherein the second feedback circuit comprises a first resistor and a second resistor connected in series to each other,
wherein, when the control signal is low, the input voltage of the DC-DC converter is applied to one end of the connected resistors and the output voltage of the DC-DC converter is applied to the other end of the connected resistors, and when the control signal is high, the output voltage is applied to one end of the connected resistors and the other end of the connected resistors is connected to ground, wherein the second feedback circuit generates the second feedback voltage at a junction node between the first resistor and the second resistor.

7. The DC-DC converter control circuit according to claim 1, wherein the second feedback circuit comprises a first resistor and a second capacitor connected in series to each other, wherein, when the control signal is low, the input voltage of the DC-DC converter is applied to a resistor side of the connected resistor and capacitor, and the output voltage of the DC-DC converter is applied to a capacitor side of the connected resistor and capacitor, and when the control signal is high, the output voltage is applied to the resistor side of the connected resistor and capacitor, and the capacitor side of the connected resistor and capacitor is connected to a ground terminal, wherein the second feedback circuit generates the second feedback voltage at a junction node between the first resistor and the second capacitor.

8. The DC-DC converter control circuit according to claim 1, wherein the second feedback circuit comprises a ripple signal generator circuit to detect a ripple signal in accordance with a ripple current flowing through the inductor of the DC-DC converter for output as the second feedback voltage.

9. The DC-DC converter control circuit according to claim 1, further comprising a second comparator to detect a reverse current flowing from the output terminal to the ground terminal via the inductor and the second switching element when the first switching element is switched on, wherein the driver circuit switches off both the first switching element and the second switching element when the second comparator detects a reverse current.

10. The DC-DC converter control circuit according to claim 1, wherein the DC-DC converter comprises an output resistor connected between the output terminal and a junction node between the inductor and the first capacitor.

11. The DC-DC converter control circuit according to claim 10, wherein the first feedback circuit detects a voltage across the output resistor, generates a feedback current corresponding to the voltage across the output resistor, and converts the feedback current into a voltage to generate the first feedback voltage.

12. A DC-DC converter comprising:
a power supply terminal to which an input voltage is input;
a ground terminal;
an output terminal to output an output voltage;
a first switching element and a second switching element connected in series between the power supply terminal and the ground terminal;
an inductor connected between the output terminal and a junction node between the first switching element and the second switching element;
a first capacitor connected between the output terminal and the ground terminal; and
a DC-DC converter control circuit comprising:
 a first feedback circuit to detect an output current of the DC-DC converter and generate a first feedback voltage indicating a direct-current component of an inductor current flowing through the inductor based on the output current;
 a second feedback circuit to generate a second feedback voltage indicating an alternating-current component of the inductor current flowing through the inductor based on the input voltage and the output voltage of the DC-DC converter;
 a synthesis circuit to add the first feedback voltage and the second feedback voltage to generate a third feedback voltage;
 a reference voltage generator circuit to generate a predetermined reference voltage corresponding to a desired output current of the DC-DC converter;
 a first comparator to compare the third feedback voltage with the reference voltage to output a control signal in accordance with the comparison result; and
 a driver circuit to control the switching elements so that when the control signal is low, the first switching element is switched on and the second switching element is switched off, and when the control signal is high, the first switching element is switched off and the second switching element is switched on,
wherein the second feedback circuit operates in accordance with the control signal and generates the second feedback voltage based on a difference between the input voltage and the output voltage when the control signal is low and generates the second feedback voltage based only on the output voltage when the control signal is high.

13. The DC-DC converter according to claim 12, further comprising:
an output resistor connected between the output terminal and a junction node between the inductor and the first capacitor.

14. The DC-DC converter according to claim 13, wherein the first feedback circuit of the DC-DC converter control circuit detects a voltage across the output resistor, generates a feedback current corresponding to the voltage across the output resistor, and converts the feedback current into a voltage to generate the first feedback voltage.

* * * * *